US012757889B2

(12) United States Patent
Hickle et al.

(10) Patent No.: US 12,757,889 B2
(45) Date of Patent: Oct. 13, 2026

(54) PEST CONTROLLING SYSTEMS

(71) Applicant: FarmSense, Inc., Riverside, CA (US)

(72) Inventors: Leslie Ann Hickle, Yuma, AZ (US); Shailendra Singh, Riverside, CA (US)

(73) Assignee: FarmSense, Inc., Riverside, CA (US)

( * ) Notice: Subject to any disclaimer, the term of this patent is extended or adjusted under 35 U.S.C. 154(b) by 0 days.

(21) Appl. No.: 18/893,846

(22) Filed: Sep. 23, 2024

(65) Prior Publication Data

US 2026/0083117 A1 Mar. 26, 2026

(51) Int. Cl.
*A01M 29/12* (2011.01)
*A01M 31/00* (2006.01)

(52) U.S. Cl.
CPC .......... *A01M 29/12* (2013.01); *A01M 31/002* (2013.01)

(58) Field of Classification Search
CPC ...... A01M 31/00; A01M 13/00; A01M 25/00; A01M 1/02; A01M 1/06; A01M 1/10; A01M 1/12
See application file for complete search history.

(56) References Cited

U.S. PATENT DOCUMENTS 4,734,281 A 3/1988 Yamamoto et al.
4,834,745 A 5/1989 Ogawa et al.
5,503,839 A 4/1996 Saguchi et al.
6,216,960 B1 4/2001 Aiba et al.
6,599,500 B1 7/2003 Ogawa et al.
7,055,295 B1 6/2006 Aiba et al.
7,856,753 B2 12/2010 Fisher
8,278,360 B2 10/2012 Tatsuki et al.
8,834,910 B2 9/2014 Hojo et al.
8,900,611 B2 12/2014 Hojo et al.
10,007,241 B1 6/2018 Hedin et al.
10,986,829 B2 4/2021 Saguchi et al.
11,117,734 B2 9/2021 Clark et al.
11,490,609 B2 * 11/2022 Cherukumalli ......... A01M 1/02
11,820,582 B2 11/2023 Clark et al.
12,044,820 B2 7/2024 Singh et al.
(Continued)

FOREIGN PATENT DOCUMENTS

EP 0243263 B1 10/1987
EP 0913088 B1 5/1999

OTHER PUBLICATIONS

Benelli, Giovanni, et al; Sex Pheromone Aerosol Devices for Mating Disruption: Challenges for a Brighter Future, Sep. 20, 2019; Insects 2019, 10, 308; www.mdpi.com/journal/insects.
(Continued)

*Primary Examiner* — Joshua J Michener
*Assistant Examiner* — Henry Hooper Mudd
(74) *Attorney, Agent, or Firm* — Lynch LLP; Sean Lynch

(57) ABSTRACT

Systems and methods for pest detection and control using sensors and chemical dispersers. Systems use sensors to detect and classify pests based on wingbeat frequency and other environmental data, such as temperature and humidity. This information is then used to deploy targeted pest control chemicals, such as pheromone-based chemicals, which disrupt pest mating cycles without harming the environment. Systems aim to improve pest control effectiveness, reduce costs, and minimize environmental impacts by leveraging detailed information about pest types, locations, and activity times to deploy highly targeted interventions.

13 Claims, 6 Drawing Sheets

(56) References Cited

U.S. PATENT DOCUMENTS

| | | | | |
|---|---|---|---|---|
| 2004/0021087 | A1 | 2/2004 | Tokhtuev et al. | |
| 2004/0216353 | A1* | 11/2004 | Caine | A01M 1/00 43/1 |
| 2008/0210772 | A1* | 9/2008 | Pearce | A01G 27/00 239/67 |
| 2009/0012728 | A1 | 1/2009 | Spanier et al. | |
| 2012/0024427 | A1 | 2/2012 | Gass et al. | |
| 2014/0250767 | A1 | 9/2014 | Heugle et al. | |
| 2015/0145417 | A1 | 5/2015 | Woelfing et al. | |
| 2015/0234049 | A1 | 8/2015 | Weber-Grabau | |
| 2017/0055511 | A1 | 3/2017 | Mafra-Neto et al. | |
| 2019/0187281 | A1* | 6/2019 | Weber-Grabau | G01S 17/02 |
| 2020/0000089 | A1 | 1/2020 | Hojo et al. | |
| 2020/0101189 | A1* | 4/2020 | Roach | A61L 9/22 |
| 2020/0108408 | A1* | 4/2020 | Duff | B05B 12/02 |
| 2020/0367483 | A1* | 11/2020 | Geier | A01M 1/02 |
| 2022/0159943 | A1* | 5/2022 | Schwerte | A01M 29/10 |
| 2023/0025931 | A1 | 1/2023 | Ogawa et al. | |
| 2023/0341583 | A1 | 10/2023 | Singh et al. | |
| 2023/0341584 | A1 | 10/2023 | Singh et al. | |

OTHER PUBLICATIONS

Klassen, Darius, et al; Dispensers for pheromonal pest control, Journal of Environmental Management, Nov. 4, 2022, pp. 1-14, https://doi.org/10.1016/j.jenvman.2022.116590.

* cited by examiner

| Can we discriminate between PTB and NOW? | | Predicted Class | |
|---|---|---|---|
| | | PTB | NOW |
| Actual Class | PTB | 11,021 | 23 |
| | NOW | 19 | 14,293 |

PEST CONTROLLING SYSTEMS

FIELD OF THE INVENTION

The field of the invention is pest control via chemical distribution.

BACKGROUND

The background description includes information that may be useful in understanding the present invention. It is not an admission that any of the information provided in this application is prior art or relevant to the presently claimed invention, or that any publication specifically or implicitly referenced is prior art.

Insect pests pose a serious threat to agricultural crops, causing significant losses in yield and quality. According to the Food and Agriculture Organization, insect pests are responsible for about 40% of global crop losses annually, affecting the livelihoods of millions of farmers and the food security of billions of people. Moreover, in addition to plant pests, insect pests can transmit diseases to animals and humans. To combat insect pests, plant and animal producers, farmers, urban pest control professionals and homeowners, often rely on synthetic pesticides, which have negative impacts on the environment, human health, and biodiversity, especially when those pesticides are distributed in an untargeted manner.

Alternatives to traditional synthetic pesticides include biopesticides, biochemical pesticides, repellents, and semiochemicals. Biopesticides are naturally occurring substances that control pests, microorganisms that control pests and pesticidal substances produced by plants or microorganisms. Semiochemicals include pheromones which can be used to disrupt pest reproduction and other harmful pest behaviors. By using pheromone-based chemicals, many harmful effects that can result from pesticide use can be avoided to increase crop yields and protect valuable food supplies. But overuse of any chemical can be expensive and often have negative environmental impacts. Without more information about where that pest exists in their farm and what types of pests exist, farmers have no choice but to overuse chemical interventions like pesticides, pheromone-based chemicals, or otherwise.

If farmers had a way to know what types of pests exist in their farms—and where those pests exist—those farmers could deploy anti-pest substances, such as pheromone-based chemicals, in a highly targeted and cost-effective way. In addition to information about what pests exist, information about when those pests are present could also be leveraged to create better targeted and more cost-effective pest control systems.

Even today, pest detection can feature some barely useful time-based information, leaving ample room for improvement by creating continuous pest detection and monitoring. For example, almond growers in California typically set out sticky traps that pests are attracted to and then get stuck to. Once per week, growers will check those traps and can make note of what types of pests are present. Learning about pest types once per week is not enough information to deploy targeted solutions. Some efforts have been made to improve on this system by pointing cameras at those sticky traps and taking pictures once per day. These systems fail to realize advantages conferred by continuous detection and monitoring and are notoriously inaccurate when trying to predict the population development of the pest and its economic impact on the crop.

Thus, there is a need for improved pest detection and control that improves effectiveness, reduces costs, and minimizes environmental impacts by providing more detailed information about types of pests, where those pests exist, and when those pests are most active.

SUMMARY OF THE INVENTION

The present invention provides apparatuses, systems, and methods directed to pest control. In some aspects, the techniques described herein relate to a system for pest detection and control that includes: a sensor configured to detect wingbeat information of an unknown pest; a pest classification model configured to receive the wingbeat information and to output a pest type and a pest controlling scheme; wherein the pest controlling scheme identifies a pest controlling chemical that targets the pest type and includes instructions for distribution; and a set of chemical dispersers configured to disperse the pest controlling chemical according to the instructions for distribution.

In some embodiments, the sensor is further configured to detect environmental data including temperature, pressure, and humidity. The pest classification model can be further configured to receive the environmental data and wherein the pest controlling scheme is developed at least in part using the environmental data. In some embodiments, the pest controlling chemical includes a pheromone-based chemical that is designed to interrupt the lifecycle of the pest type. In some embodiments, the set of chemical dispersers are placed around the sensor. Each chemical disperser can be configured to disperse the pest controlling chemical at a flow rate that is controlled by a pulse-width modulator.

Wingbeat information can be timestamped and the pest controlling scheme can be developed at least in part according to times of day that the unknown pest is active. In some embodiments, the pest type includes a pest species.

In some aspects, the techniques described herein relate to a system for pest detection and control that includes: a sensor configured to detect wingbeat information of an unknown pest by measuring infrared light perturbations; a computing device configured to receive the wingbeat information from the sensor and to apply a pest classification model, wherein the pest classification model is configured to output a pest type and a pest controlling scheme; wherein the pest controlling scheme identifies a pheromone-based chemical that targets the pest type and includes instructions for distribution; a set of chemical dispersers, wherein each chemical disperser is configured to receive a portion of the instructions for distribution from the computing device, where the portion received by each chemical disperser is specific to the chemical disperser that received it; and wherein each chemical disperser of the set of chemical dispersers is configured to disperse the pheromone-based chemical.

In some embodiments, the sensor is further configured to detect environmental data including temperature, pressure, and humidity. The pest classification model can be further configured to receive the environmental data and wherein the pest controlling scheme is developed at least in part using the environmental data. In some embodiments, the pest controlling chemical includes a pheromone-based chemical that is designed to interrupt the lifecycle of the pest type.

In some embodiments, the set of chemical dispersers are placed around the sensor. Each chemical disperser can be configured to disperse the pest controlling chemical at a flow rate that is controlled by a pulse-width modulator. The wingbeat information can be timestamped and the pest controlling scheme can be developed at least in part according to times of day that the unknown pest is active. In some embodiments, the techniques described herein relate to a system, wherein the pest type includes a pest species.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
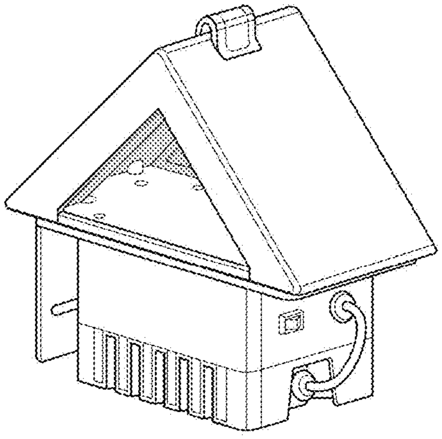
FIG. 1 illustrates a sensor.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the language expressing numbers, number ranges, quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

Systems and methods of the inventive subject matter comprise sensors and chemical dispersers. Sensors detect and classify pests and then chemical dispersers are selectively triggered to distribute chemicals that combat the type of pest that the sensors detect. In preferred embodiments, pheromone-based chemicals are selectively distributed according to sensor information and sensor location. Pheromone-based chemicals are configured to interrupt pest life cycles while minimizing harm to the environment and to other insects, animals, and plants that might otherwise be harmed by chemical pesticides. Although pheromone-based chemicals are used in preferred embodiments, systems and methods of the inventive subject matter can also deploy pesticides, repellents, biochemical pesticides and biological pesticides.

Embodiments are thus directed to pest detection and control systems and methods that are inspired by biological systems. Embodiments aim to mitigate societal challenges in food production and human health by using sensors for insect pest surveillance and pheromone-based mating disruption to control pests. By implementing high-resolution sensors to gather insect prevalence data, embodiments are able to enable natural pest control methods, reducing the need for harsh pesticides. Embodiments draw inspiration from, e.g., the ability of bats to classify insects using wingbeat frequency, applying similar principles through the sensors that use light instead of sound to report insect prevalence.

Sensors of the inventive subject matter collect data on insect prevalence, including metadata like temperature and humidity. Those sensors can then send that information out for processing and analysis (e.g., to a server, a cloud server, a computing device, or the like). Sensor information, once analyzed, can reveal what types of pests exist and where those pests exist within a monitored area. This information is then used to deploy targeted, environmentally responsible pest control interventions such as pheromone-based chemicals.

Rather than kill pests outright by distributing harmful pesticides that can also be harmful to people or the environment, pheromone-based chemicals prevent or disrupt pest mating, which ultimately results in elimination or near-elimination of the target pests. Thus, by disrupting mating, crops are protected, increasing yields. Ultimately, by managing pests, systems and methods of the inventive subject matter improve food security, reduce pesticide use, increase agricultural competition, and contribute to economic development.

FIG. 1 illustrates a sample sensor. The sensors of the inventive subject matter can be configured with several different capabilities. For example, sensors use infrared light to detect pests. Sensors send out infrared light from emitters, and when that light is then picked up by detectors, perturbations and changes in the light signal are interpreted to determine whether pests are present. Those perturbations and changes in the detected infrared light can be caused by wingbeats of whatever pest is detected, and sensors can then compare detected wingbeat information to a database of known pests that are classified according to wingbeat information. In doing so, sensors of the inventive subject matter are capable of identifying specific pest types through their unique wingbeat characteristics, using a database of classified insects and pests.

In some configurations, sensors can detect pests within a certain range of the sensors (e.g., 5 ft, 10 ft, 20 ft, and so on). These sensors are referred to as range-type sensors. But some sensors are configured to detect pests in a more range-limited capacity. For example, sensors can be configured as disclosed in US Patent Application No. 2023/0341583, where pests that pass through a light pathway between one or more emitters and one or more detectors are detected and classified by the sensors. These sensors are referred to as pass-through type sensors. Pass-through type sensors measure perturbations in infrared light, where those perturbations correspond to the flapping wings of a pest (e.g., an insect).

Both range-type and pass-through type sensors can be implemented into systems and methods of the inventive subject matter. Range-type sensors can be more effective at detecting pests over a wide area, which can facilitate different control schemes for other mechanisms and components within a system of the inventive subject matter. Pass-through type sensors, on the other hand, are effective at detecting pests within a more limited area, though information from pass-through type sensors can still be leveraged in many of the same ways as range-type sensors.

For pass-through type sensors, pests are detected once they cross a sensor. Pests are attracted to the sensor because by a lure or attractant inside the sensor, so in a sense, the range of the sensor is as wide as the range of the lure or attractant. Determining range of pass-through sensors is challenging, and instead of deploying pass-through type sensors based on area of coverage, pass-through type sensors are typically deployed based on economic considerations. Economic considerations include crop type, field maintenance costs, pesticide costs, expected profits, and so forth. When referring to sensors, generally, the term should be understood as referring to either pass-through sensors or range-type sensors.

Sensors of the inventive subject matter can be configured to collect weather and atmospheric information, such as temperature, relative humidity, barometric pressure, wind speed, ambient light levels and so forth. Weather information can then be used to realize network benefits in systems comprising multiple sensors. Examples of network benefits are described below. Sensors can also associate all collected information with time. By associating times with information collected by sensors, time information can be used to further improve targeting and effectiveness of a deployed pest controlling chemical.

In addition to detecting the presence of different types of pests, sensors of the inventive subject matter can count how many pests of each type it detects. Pest counts that are sorted by pest type can be used to improve pest control. For example, if a first pest type is detected in very high numbers, then a system can use that information to determine how much of a pest controlling chemical needs to be deployed to control that type of pest.

Thus, farms can install sensors with accompanying chemical dispersers at varying distances from other sensors. For example, some crops have one sensor per 10 acres, while other crops can have multiple sensors in a 1-acre area. In addition to varying distances and densities among sensors, sensors can be accompanied by chemical dispersers that similarly vary in density and distance from one another. For example, almonds can have one sensor per 10 acres for pest monitoring, with one chemical disperser per acre to distribute pest controlling chemicals. A field with such a configuration would have one sensor that is associated with 10 chemical dispersers.

Disperser locations and disperser density can vary within a given area. For example, for more sensitive crops a higher dispenser density may be beneficial, which could result in an area having a higher density of disperses in one subarea corresponding to the more and lower density everywhere else.

Figure 2A:
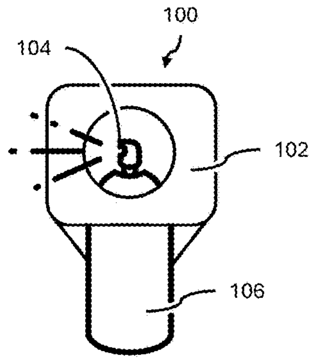
FIG. 2A shows a chemical disperser.
Figure 2B:
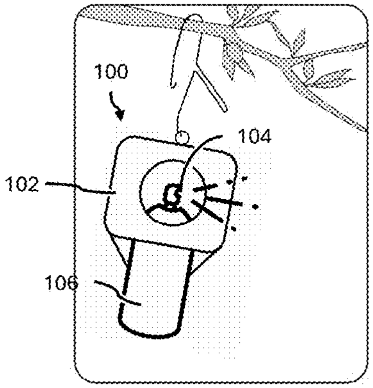
FIG. 2B shows a chemical disperser hanging in a tree.

FIGS. 2A and 2B show a disperser 100 of the inventive subject matter. Disperser 100 includes a body 102 having a nozzle 104. Body 102 houses necessary electronics such as a wireless communication module (e.g., Wifi, Bluetooth, or the like). Body 102 comprises a bottom portion that can receive cartridge 106. Cartridge 106 can hold one or more chemicals, including pheromone-based chemicals that can be sprayed out by disperser 100. FIG. 2A shows disperser 100 by itself, and FIG. 2B shows disperser 100 hanging in a tree, demonstrating one way in which dispersers of the inventive subject matter can be deployed. Dispersers can also be deployed by setting them on the ground, placing them on poles, attaching them to vehicles, and so on.

Figure 3:
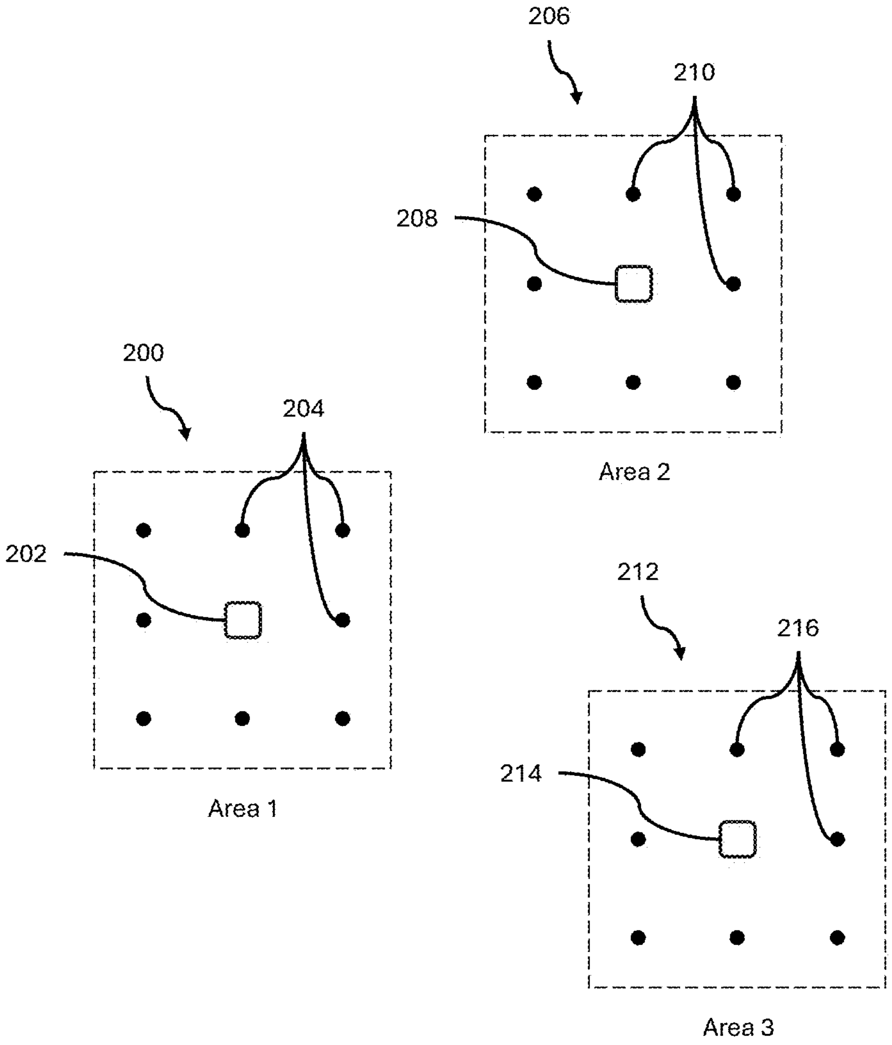
FIG. 3 shows an example of multiple areas where systems of the inventive subject matter are deployed.

FIG. 3 shows an example of multiple areas where systems of the inventive subject matter are deployed. Each area shown in FIG. 3 can represent a field, a portion of a field, or any other space in which unwanted pests may exist, such as orchards, field crops, livestock operations, backyards (e.g., mosquitos), golf courses, greenhouses, and the like. For example, area one 200 has a first sensor 202 and a first array of chemical dispersers 204, area two 206 has a second sensor 208 and a second array of chemical dispersers 210, and area three 212 has a third sensor 214 and a third array of chemical dispersers 216. Each area has a sensor and an associated set of chemical dispersers. Chemical dispersers are drawn as surrounding each sensor. In some embodiments, a chemical disperser is colocated with a sensor in addition to the other chemical dispersers that are associated with the sensor.

Chemical dispersers should be arranged within some proximity of a sensor (or sensors) that they are associated with, and what defines an appropriate proximity can vary depending on a grower's needs. By having sensors placed closer to one another, chemical dispersers can be arranged closer to each associated sensor, in effect increasing targeting resolution for pest controlling chemicals. For example, each chemical disperser can be placed no more than 100 yards from a sensor in some embodiments (where any distance less than 100 yards may be appropriate). Chemical dispersers can be arranged such that some dispersers are closer to the sensor than others (e.g., as a grid or the like).

In some embodiments, information from one area can be used in other areas to realize network effects. For example, if sensor 208 in area two 206 detects the presence of a type of pest, and sensor 208 indicates that wind is blowing from area two 206 toward area one 200 and area three 212, then a system whereby sensors 202, 208, and 214 are networked together could preemptively deploy pest controlling chemicals in area one 200 and area three 212 in anticipation of pests being carried by the wind. In some embodiments, a weather information over some period of time can be used. For example, if one or more sensors indicate that during certain times of year, wind directions blow predominantly in one direction, then sensor networks can preemptively deploy pest controlling chemicals in downwind areas when upwind areas detect that pest type.

Other network effects can be realized based on the types of pests that are detected. For example, if a sensor detects a type of pest that has a known migration pattern, then once that type of pest is detected, different areas in an expected migratory path can deploy pest controlling chemicals based on migration information and, e.g., weather information. Although FIG. 3 shows only three areas with three different sensors with associated chemical dispersers, many additional sensors with associated chemical dispersers can be networked together to create large pest control systems that span entire farms or even across regions.

Figure 4:
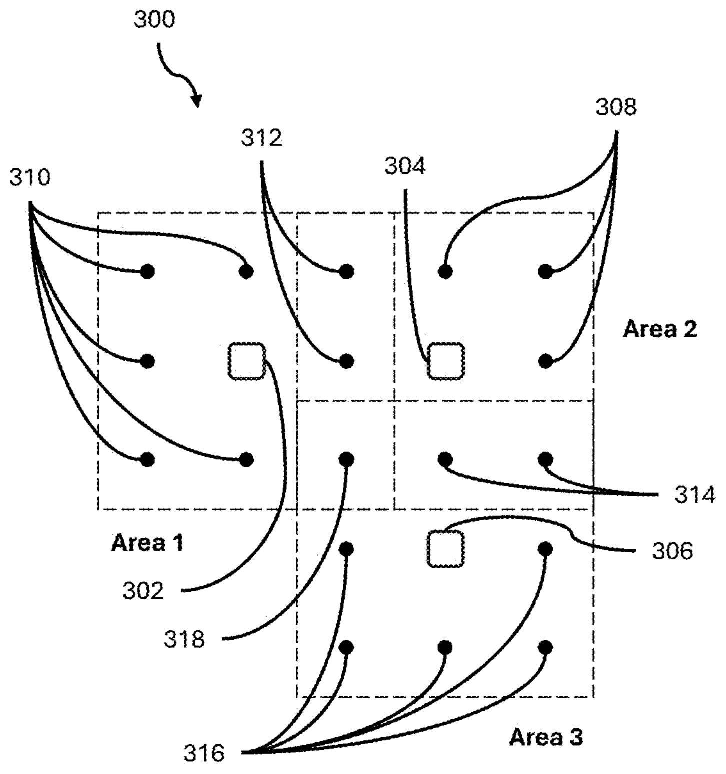
FIG. 4 shows another possible configuration for multiple areas having sensors, where individual may be controlled by multiple sensors.

FIG. 4 shows another possible configuration for multiple areas having sensors, where individual may be controlled by multiple sensors. FIG. 4 shows a growing space 300 having three overlapping areas. Area 1 has sensor 302 at its center, area 2 has sensor 302 at its center, and area 3 has sensor 302 at its center. Each sensor is configured to control 8 chemical dispersers that surround it, but because the areas overlap, chemical disperser control also overlaps. For example: sensor 302 controls chemical dispersers 310, 312, and 318, sensor 304 controls chemical dispersers 308, 312, 314, and 318; and sensor 306 controls chemical dispersers 316, 314, and 318. Sensor 302 has exclusive control of chemical dispersers 310, it shares control of chemical dispersers 312 with sensor 304, and it shares control of disperser 318 with sensors 304 and 306. Sensor 304 has exclusive control of chemical dispersers 308, it shares control of chemical dispersers 314 with sensor 306, it shares control of chemical dispersers 312 with sensor 302, and it shares control of chemical disperser 318 with sensors 302 and 306. Sensor 306 has exclusive control of chemical dispersers 316, it shares control of chemical dispersers 314 with sensor 304, and it shares control of chemical disperser 318 with sensors 302 and 304.

Figure 5:
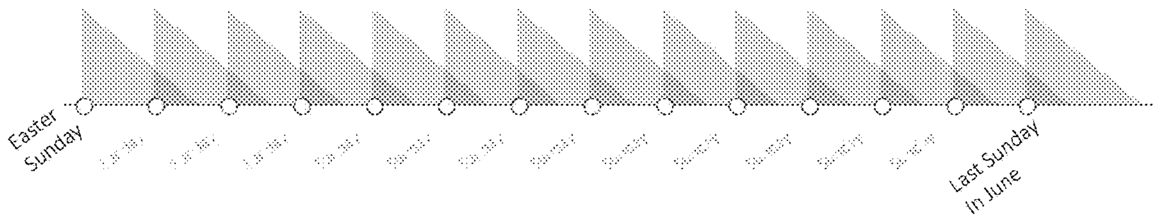
FIG. 5 shows a typical pesticide schedule.

FIG. 5 shows a typical pesticide schedule. According to the graph, pesticide is sprayed every Sunday, and its effectiveness is depicted as dissipating linearly over time such that pesticide is at least somewhat effective for longer than one week. Because new pesticide is sprayed every Sunday, the previous Sunday's pesticide will still be effective to create an overlap. Creating an overlap ensures that an area over which pesticide is sprayed is never left unprotected.

Although the figure shows spikes with linear declines, the true nature of pesticide effectiveness over time is likely non-linear, and a variety of factors can impact effectiveness. For example, rain, wind, and other weather phenomena can impact how much of a pesticide must be sprayed as well as how soon after spraying the pesticide should be sprayed again. This is true not only for pesticides, but also for other pest controlling chemicals. But existing systems may not account for factors that impact effectiveness of pesticides and other pest controlling chemicals. Existing systems also lack sensors to actually detect pests, so harsher chemicals are sprayed to account for a wide variety of different pests and those chemicals are sprayed more regularly to prevent gaps in coverage. Moreover, older systems are unable to apply targeted pesticides. Because pest detection is not part of older systems, entire fields must all be sprayed to ensure crops are protected.

Figure 6:
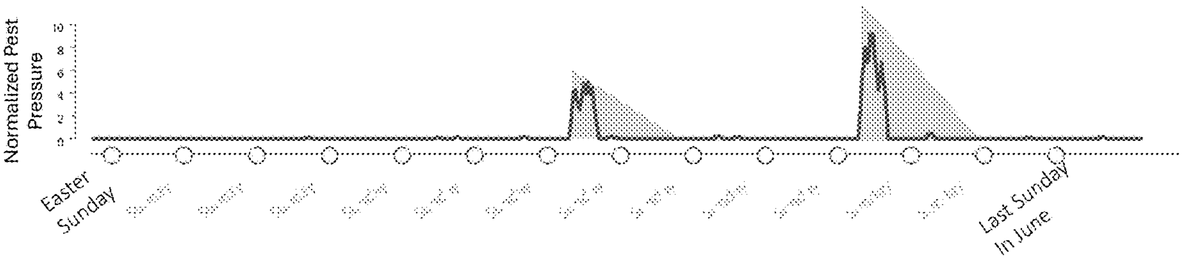
FIG. 6 shows a targeted chemical distribution schedule that systems of the inventive subject matter can implement.

Systems of inventive subject matter, on the other hand, can apply pest controlling chemicals to targeted areas based on pests that are actually detected in those areas. This makes a spraying schedule like the one shown in FIG. 5 unnecessary. Instead, FIG. 6 shows a targeted chemical distribution schedule that systems of the inventive subject matter can implement. Sensors of the inventive subject matter are used to detect pest locations and pest types. Combined with time information, location and pest type can be used to deploy targeted chemicals. As shown in FIG. 6, when normalized pest pressure spikes, indicating the presence of a pest, chemicals such as pesticide or pheromone-based chemicals that disrupt the pests' lifecycle are deployed by chemical dispersers. The sprayed chemicals remain in effect while normalized pest pressure indicates the presence of pests. By deploying chemicals based on pest observation and classification, a far lower volume of chemicals are needed to protect a crop.

Systems and methods of the inventive subject matter facilitate highly targeted distribution of pest controlling chemicals. Targeting can involve deploying chemicals that are specifically designed to address a type of pest, and targeting can also have a timing aspect. For example, if a certain type of pest is only active a certain times of day, and that pest is detected by a sensor, then chemical dispersers can be activated at the time of day when that type of pest is most likely to be active and therefore most likely to be exposed to the deployed chemical.

Figure 7A:
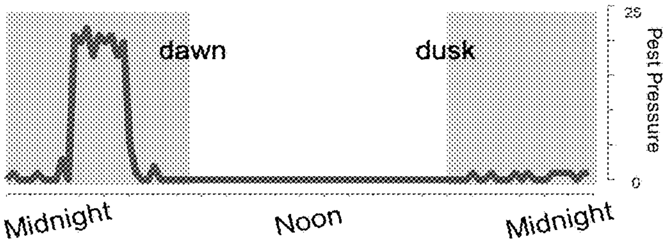
FIG. 7A shows an example of pest activity over a 24-hour period.
Figure 7B:
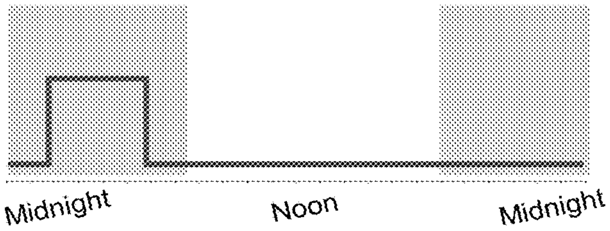
FIG. 7B shows a chemical distribution schedule based on the pest activity measured in FIG. 7A.

FIG. 7A shows an example of pest activity over a 24-hour period. It shows that a pest is active in pre-dawn hours from approximately 4 am to 6 am, inactive during the day, and minimally active at night before midnight. This activity can be detected by sensors of the inventive subject matter, and based on pest activity information, a system could activate its chemical dispersers to deploy a pest controlling chemical targeting the detected pest in the pre-dawn hours right before (or even during) the pest's most active period. FIG. 7B shows targeted chemical distribution schedule that is based on the pest activity measured in FIG. 7A. According to FIG. 7B, chemicals are dispersed from one or more chemical dispersers for a duration of time and during a period of time that corresponds with pest activity as measured and shown in FIG. 7A.

Without information about when pests are active, farmers (and other growers) often assume that pests are present from dusk to dawn, and thus to control those pests, chemicals must be deployed at regular intervals throughout the day. This assumption ensures pests are always exposed to pest controlling chemicals, but at the expense of deploying far more chemicals than are necessary to address a pest problem. By using information about when a pest is active, growers can save, e.g., up to 80% of their pest controlling chemical costs.

An example of a pest that can be detected and controlled using systems and methods of the inventive subject matter is the navel orangeworm (Amyelois transitella). Navel orangeworms can be controlled using pheromone-based chemicals that interrupt the navel orangeworm's lifecycle. Pheromone-based chemicals that target navel orangeworms make it difficult for males to locate females, which prevents mating and blocks the reproductive cycle. Unlike harsh pesticides, pheromone-based chemicals do not create any collateral damage to the environment or to pollinators such as bees, as the pheromones that a pheromone-based chemical emulates are specific to a particular pest (such as the navel orangeworm). Moreover, to treat a given area, a tiny volume of pheromone-based chemicals are needed relative to a volume of pesticide needed to treat that same area.

Systems and methods of the inventive subject matter are inspired by biological systems. Bats serve as inspiration for the sensors used in these systems. Bats are able to distinguish between different types of prey using echolocation. For example, bats can distinguish tiger moths from other visually similar species. Tiger moths are toxic to bats, so it is imperative for bats to avoid eating them, and bats have evolved to distinguish between tiger moths and more palatable insects in complete darkness. Bats are able to do this using multiple clues collected via echolocation, including the insect's wingbeat frequency. Given the knowledge that insects can be classified according to wingbeat information, systems of the inventive subject matter use sensors that detect wingbeat information of pests and use that wingbeat information to classify the pests. All information collected by sensors of the inventive subject matter described here and elsewhere in this application is useful in developing highly targeted application of pest control interventions including pheromone-based chemicals, pesticides, or any other type of substance that can be deployed to control pests.

Systems of the inventive subject matter are trained to classify pests using massive amounts of data about different pests. Classification can be undertaken using a local computing device or by using one or more remote, network connected computing devices (e.g., cloud services or the like). Classification models of the inventive subject matter are models that should be understood as being usable only by computing systems, specifically because models of the inventive subject matter can be the result of machine learning and neural networks—neither of which is directly reproducible by any kind of biological system. Systems can be trained to detect any insect species. For example, for any given insect species wingbeat information, temperature, humidity, air pressure, ambient light, life stage, and sex can all be used to train the system to identify that species when it passes through a sensors of the inventive subject matter. These insect classification models thus facilitate highly accurate pest counting and classification. Each pest that passes through a sensor of the inventive subject matter can thus be classified according to its sex and species and with all other environmental or other metadata described in this application also associated therewith.

Figure 8:
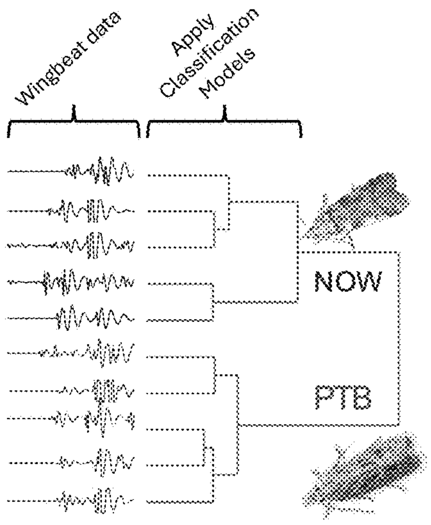
FIG. 8 shows how classification models can be applied to wingbeat data to distinguish between two different types of pests.

FIG. 8 shows how classification models can be applied to wingbeat data to distinguish between two different types of pests: the navel orangeworm (NOW) and the peach twig borer (PTB). In this figure, actual pest species is compared to predicted pest species. Wingbeat data is run through classification models to figure out which pest the collected wingbeat data indicates. This process is shown visually in FIG. 8. The outcome of applying wingbeat data to the classification models is that the predicted class of pest very closely matches the actual class of pest, as shown in the table portion of FIG. 8. Thus, embodiments of the inventive subject matter are capable of highly accurate pest classification.

Figure 9:
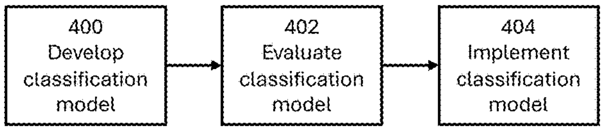
FIG. 9 is a flowchart describing the process of creating classification models of the inventive subject matter.
Figure 10:
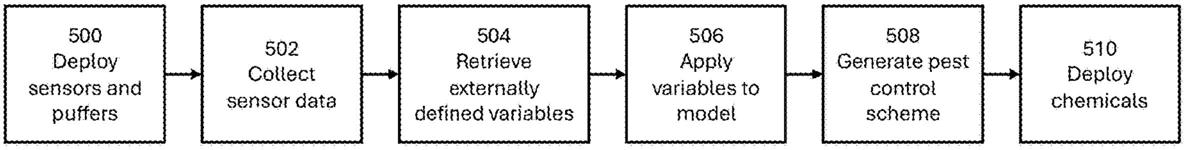
FIG. 10 is a flowchart describing how systems of the inventive subject matter can be deployed and operated.

FIG. 9 is a flowchart describing the process of creating classification models of the inventive subject matter. In step 400, a classification model is developed. Creating classification models can be done in close collaboration with entomologists, who understand the factors correlated with flight prevalence (even if they cannot quantify the relationships or fully understand the cause of the relationship), and computer scientists who specialize in building models of systems. Although this application describes creating "models" plural, it may be the case that a single model works for all insects, or that a single model may work for all of a, or at least all of a certain type of insect, such as lepidoptera. Using lepidoptera as an example, there are over 180,000 species within the lepidoptera order, including at least a few hundred that are pests to one or more crops. But if all moth pests are sorted by economic importance, a classic Zipf distribution results (Zipf's law is an empirical law that often holds, approximately, when a list of measured values is sorted in decreasing order), suggesting that 20% of moths are responsible for 80% of economic harm to crops. Classification models of the inventive subject matter can be designed to classify many commercially important insects, including codling moth, corn earworm, fall armyworm, peach twig borer, tobacco moth, and Indian meal moth.

Developing classification models can be treated as a machine learning classification problem. To develop classification models, it is important to consider what features or combination of features best predict different classes, and these features or combination of features can be discerned by learning from, e.g., existing research on feature discovery and feature generation for classification. Although any machine learning classification model could be used, it has been discovered that Bayesian networks allow for encoding domain-specific knowledge. For example, temperature as it relates to air density and air density as it relates to wingbeat frequency can be encoded into a model.

Once a classification model is created, its performance must be evaluated in step 402. In a classic machine learning sense, the root-mean-squared-error (RMSE) between predicted and observed circadian activity graphs can be evaluated. All sensible baselines can be compared, including persistence (e.g., is today's data the same as yesterday's data), propinquity (e.g., is this sensor's data the same as the nearest other sensor's data), uniformity, and randomness. While RMSE works as an internal target for optimization, it is indirect. Thus, it can also be good to evaluate a measure of economic benefit enjoyed by using a model, such as return on investment, cost savings, and so forth. Economic benefit can be estimated using a model and it can also be measured after a model is implemented into a real-life system. Finally, once a classification model is created and evaluated, it can be implemented into a system of the inventive subject matter to classify pests according to information collected by sensors according to step 404.

FIG. 9 is a flowchart describing how a system of the inventive subject matter works, broadly speaking. In step 500, sensors and chemical dispersers are deployed in an area where pest control is needed. Chemical dispersers can be controlled by one or more sensors. In some embodiments, each sensor has an associated set of chemical dispersers (where the set of chemical dispersers can have one or more chemical dispersers). Once deployed and activated, sensors begin collecting data in step 502. Data that can be collected for input into a model of the inventive subject matter can include two different types of variables: measurable variables and externally defined variables.

Measurable variables are variables that can be detected and defined by sensors that are part of systems of the inventive subject matter. For example, sensors of the inventive subject matter can measure temperature, humidity, pressure, wind direction, wind speed, wingbeat frequency, ambient light, and so on (as described in this application).

Externally defined variables can include any variable that is defined externally to a system of the inventive subject matter. For example, sensors external to systems of the inventive subject matter can include weather stations and weather sensors, and although weather stations and weather sensors may measure all or some of the same variables measured by a sensor that is included in a system of the inventive subject matter, such externally defined variables can nevertheless provide useful information. For example, by collecting temperatures from many different local weather sensors outside of a sensor included with a pest controlling system of the inventive subject matter, a temperature gradient can be developed for an area. Something similar can be done with wind speeds, where wind speeds collected from many sources, internal or external, can be used to create a wind speed map of an area to create highly localized models of wind speeds for an area where crops are grown. This information can be used to further improve pest controlling chemical distribution.

Other externally defined variables can include time, canopy cover, Koppen system climate zone, date, season, slope of terrain, soil type, crop spacing, UV index, sunlight intensity, cloud cover, and so on. Some externally-defined variables can also be defined by external entities or organizations (e.g., NOAA, NWS, the Met office, ESA, and so on). All variables, for internally defined and externally defined can be used by models of the inventive subject matter to generate better classifications. Thus, in step 506, both measurable variable and externally defined variables are applied to one or more classification models.

In addition to environmental externally defined variables like those mentioned above, economic variables can also be considered. For example, pest controlling chemical prices, current and forecasted crop prices, operating costs, and so on can be considered in an effort to improve economic efficiency.

Classification models of the inventive subject matter thus receive defined variables as input (either measurable variables or externally defined variables) and generate pest control schemes as output in step 508. A pest control scheme defines what pest controlling chemicals should be distributed, when they should be distributed, how much should be distributed, at what rate they should be distributed, and so on. A pest control scheme can instruct one or more chemical dispersers of the inventive subject matter to disperse specific pest controlling chemicals (e.g., pheromone-based chemicals). In other words, pest controlling schemes identify one or more pest controlling chemicals and provide instructions for its distribution via chemical dispersers of the inventive subject matter, where instructions for distribution include instructions that can affect the operation of any aspect of a chemical disperser.

In some embodiments, a single sensor with associated chemical dispersers makes up a system of the inventive subject matter. In such a system, the pest control scheme would include instructions for the associated chemical dispersers. Those chemical dispersers would then disperse chemicals according to the pest control scheme in a way that is tailored for one or more pests that the sensor identified (and according to environmental variables—either measured or externally defined—if necessary). Pest control schemes can selectively activate different chemical dispersers within a system according to any variable discussed in this application. For example, if a sensor is designed to cover a very large area and has a large array of associated chemical dispersers, then those dispersers may be activated selectively according to disperser location as well as wind direction and speed. In embodiments where multiple systems of the inventive subject matter are networked together, a pest control scheme can provide activation instructions for chemical dispersers across multiple systems using variables defined by multiple sensors.

In step 508, multiple control schemes can be produced to address a single pest. By creating multiple control schemes, A/B testing can be conducted to determine which scheme is the most effective. Conducting A/B testing in this way can help to optimize a control scheme and can also be used to generate better optimized control schemes when the same pest appears in the future. In some embodiments, effectiveness information can be shared with other systems of the inventive subject matter.

In step 510, pest controlling chemicals are deployed by one or more chemical dispersers. Sensor data is used to ensure that only as much pest controlling chemicals as necessary are deployed, thus saving money and reducing environmental impacts.

Chemical dispersers have a variety of features that make them suitable for systems described in this application. Chemical dispersers can be created as binary devices: they are either on or off. Although having a device that is either on or off may at first appear limiting, duty cycling can be implemented to exercise more control over how chemical dispersers function. For example, suppose a pest controlling chemical discharges at a flow rate of 0.4 grams per second (GPS) from a chemical disperser, and a model suggests dispersing the pest controlling chemical at a rate of 0.2 GPS over the course of an hour to address a particular pest. This can be achieved by activating the chemical disperser using a 50% duty cycle (e.g., the disperser is on 50% of the time). By using a pulse-width modulator to control activation of a chemical disperser, virtually any dispersal rate can be achieved (so long as the rate is below the disperser's 100% on rate). Pulse-width modulators operate by alternating between off and on, where the ratio of off to on can be manipulated and where the frequency of switching between off and on can be manipulated.

Thus, in a system where a chemical disperser disperses at a flow rate of 0.4 GPS and 0.2 GPS is needed over the course of an hour, the disperser can toggle between one-minute-long on/off cycles for an hour, where the disperser is toggled by a pulse width modulator. Each disperser thus includes a pulse width modulator that is controlled by a control system (e.g., a software-based controller).

Pulse width modulators in dispersers can be hardware-based or software-based (or some mix thereof), and control systems they are paired with can take a variety of different variables into account. Control systems for pulse width modulators are given operating instructions by models of the inventive subject matter. Thus, when variables are applied to one or more models, pest control schemes are developed and those pest control schemes feature instructions for how pulse width modulators that control chemical dispersals must be operated.

Chemical dispersers of the inventive subject matter can be configured to disperse a variety of different chemicals, including pesticides and pheromone-based chemicals. In nature, semiochemicals (e.g., the chemicals that pheromone-based chemicals are designed to mimic) are highly species specific. But in some cases, growers need to control multiple pests. For example, a sensor may reveal that both navel orangeworms and peach twig borers are present in a growing area. With rare exceptions, pheromones are not antagonistic, thus a grower could control each species simultaneously (and independently) with different chemical dispersers loaded with pheromone-based chemicals for each species. In some embodiments, chemical dispersers can be configured to disperse multiple different chemicals simultaneously. This may be accomplished by including multiple nozzles or outlets on a single chemical disperser or by blending the chemicals to be dispersed before releasing the blend from a single nozzle or outlet.

Addressing pest problems with pheromone-based chemicals has some limitations. For example, grow area size and isolation can both have an impact on the effectiveness of pheromone-based interventions. For example, in small orchards, (e.g., less than 10 acres), mating disruptions may be less effective. This can also be true for large orchards that are near the source of a pest. Because pheromone-based chemicals do not kill pests and instead interfere with mating, mated females can nevertheless fly into a treated area from outside that area to lay eggs. Larvae from those eggs can then damage cops in the affected area. For example, for an insect like the navel orangeworm, crop isolation of between 50 and 100 meters should be adequate. Special border sprays may be also be implemented as part of a mating disruption program if the source of the pest is nearby.

Thus, specific systems and methods of detecting and controlling pests have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms “comprises” and “comprising” should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A system for pest detection and control, comprising:

a first sensor and a second sensor;

wherein the first sensor and the second sensor are configured to detect wingbeat information of unknown pests;

a first set of chemical dispersers and a second set of chemical dispersers;

wherein a portion of the first set of chemical dispersers also comprises a portion of the second set of chemical dispersers;

wherein the first set of chemical dispersers is deployed in proximity to the first sensor;

wherein the second set of chemical dispersers are deployed in proximity to the second sensor;

a pest classification model configured to receive the wingbeat information and to determine a pest type and a pest controlling scheme;

wherein the pest controlling scheme identifies a pest controlling chemical that targets the pest type and comprises instructions for distribution; and wherein the pest controlling chemical is selected from a plurality of pest controlling chemicals based on the pest type; wherein at least one of the first sensor and the second sensor is in operable communication with the portion of the first set of chemical dispersers and the portion of the second set of chemical dispersers.

2. The system of claim 1, wherein the sensor is further configured to detect environmental data including temperature, pressure, and humidity.

3. The system of claim 2, wherein the pest classification model is further configured to receive the environmental data and wherein the pest controlling scheme is developed at least in part using the environmental data.

4. The system of claim 1, wherein the pest controlling chemical comprises a pheromone-based chemical that is designed to interrupt the lifecycle of the pest type.

5. The system of claim 1, wherein each chemical disperser is configured to disperse the pest controlling chemical at a flow rate that is controlled by a pulse-width modulator.

6. The system of claim 1, wherein the wingbeat information is timestamped and wherein the pest controlling scheme is developed at least in part according to times of day that the unknown pests are active.

7. The system of claim 1, wherein the pest type comprises a pest species.

8. A system for pest detection and control, comprising:

a first sensor and a second sensor, both the first sensor and the second sensor being configured to detect wingbeat information of an unknown pest by measuring infrared light perturbations;

a first set of chemical dispersers and a second set of chemical dispersers;

wherein a portion of the first set of chemical dispersers also comprises a portion of the second set of chemical dispersers;

wherein the first set of chemical dispersers is deployed in proximity to the first sensor;

wherein the second set of chemical dispersers are deployed in proximity to the second sensor;

a computing device configured to receive the wingbeat information from the first sensor and the second sensor and to apply a pest classification model, wherein the pest classification model is configured to output a pest type and a pest controlling scheme;

wherein the pest controlling scheme (a) identifies a pheromone-based chemical designed to interrupt the lifecycle of the pest type and (b) comprises instructions for distribution;

wherein the pheromone-based chemical is selected from a plurality of pheromone-based chemicals based on the pest type; and wherein each chemical disperser in the first and second sets of chemical dispersers is configured to disperse the pheromone-based chemical according to the instructions for distribution; wherein at least one of the first sensor and the second sensor is in operable communication with the portion of the first set of chemical dispersers and the portion of the second set of chemical dispersers.

9. The system of claim 8, wherein the first sensor and the second sensor are both further configured to detect environmental data including temperature, pressure, and humidity.

10. The system of claim 9, wherein the pest classification model is further configured to receive the environmental data and wherein the pest controlling scheme is developed at least in part using the environmental data.

11. The system of claim 8, wherein each chemical disperser is configured to disperse the pest controlling chemical at a flow rate that is controlled by a pulse-width modulator.

12. The system of claim 8, wherein the wingbeat information is timestamped and wherein the pest controlling scheme is developed at least in part according to times of day that the unknown pest is active.

13. The system of claim 8, wherein the pest type comprises a pest species.

* * * * *